(12) United States Patent
Nose

(10) Patent No.: US 10,892,842 B2
(45) Date of Patent: Jan. 12, 2021

(54) TDMA COMMUNICATION DEVICE AND METHOD TO SELECT A TRANSMISSION SLOT WITH REDUCED RISK OF COLLISION

(71) Applicant: Furuno Electric Co., Ltd., Nishinomiya (JP)

(72) Inventor: Masaya Nose, Nishinomiya (JP)

(73) Assignee: FURUNO ELECTRIC CO., LTD., Nishinomiya (JP)

( * ) Notice: Subject to any disclaimer, the term of this patent is extended or adjusted under 35 U.S.C. 154(b) by 64 days.

(21) Appl. No.: 16/260,267

(22) Filed: Jan. 29, 2019

(65) Prior Publication Data

US 2019/0173598 A1    Jun. 6, 2019

Related U.S. Application Data

(63) Continuation of application No. PCT/JP2017/021716, filed on Jun. 13, 2017.

(30) Foreign Application Priority Data

Jul. 29, 2016    (JP) .................................. 2016-149963

(51) Int. Cl.
*H04J 3/16* (2006.01)
*H04J 3/00* (2006.01)
(Continued)

(52) U.S. Cl.
CPC .............. *H04J 3/1694* (2013.01); *H04B 1/06* (2013.01); *H04B 7/2643* (2013.01);
(Continued)

(58) Field of Classification Search
CPC ........ H04J 3/1694; H04J 3/00; H04B 7/2656; H04B 1/06; H04B 7/2643; H04W 74/0808
See application file for complete search history.

(56) References Cited

U.S. PATENT DOCUMENTS 7,620,022 B2 * 11/2009 Hiraoka ............... H04B 7/2656
                                                    370/236
8,155,032 B2 *  4/2012 Lindoff ............... H04W 72/048
                                                    370/276
(Continued)

FOREIGN PATENT DOCUMENTS

CN    105634581 A    6/2016
JP    H09-289499 A   11/1997
(Continued)

OTHER PUBLICATIONS

Extended European Search Report dated Feb. 14, 2020 in European Application No. 17833878.6-1215.
(Continued)

*Primary Examiner* — Mounir Moutaouakil
(74) *Attorney, Agent, or Firm* — Xsensus LLP

(57) ABSTRACT

The purpose is to estimate a selection interval of transmission slots of other stations. A TDMA communication device may include a receiver, an estimating information acquirer, and a selection interval estimator. The receiver may receive communication data from another station through any of a plurality of reception slots within a selection interval set based on a given nominal increment. The estimating information acquirer may acquire estimation information for an estimated selection interval of another station based on the communication data received from another station. The selection interval estimator may estimate the estimated selection interval based on the estimation information.

10 Claims, 11 Drawing Sheets

(51) Int. Cl.
*H04B 1/06* (2006.01)
*H04B 7/26* (2006.01)
*H04W 74/08* (2009.01)

(52) U.S. Cl.
CPC .............. *H04B 7/2656* (2013.01); *H04J 3/00* (2013.01); *H04W 74/0808* (2013.01)

(56) References Cited

U.S. PATENT DOCUMENTS

| | | | | |
|---|---|---|---|---|
| 8,503,343 | B2* | 8/2013 | Kawakami | H04W 52/0216 370/311 |
| 8,780,788 | B2* | 7/2014 | Peach | G01S 13/937 370/319 |
| 9,015,567 | B2* | 4/2015 | Peach | H04B 7/18513 714/799 |
| 10,594,533 | B2* | 3/2020 | Piirainen | H04L 27/2647 |
| 2004/0146043 | A1* | 7/2004 | Hiraoka | H04J 3/0608 370/350 |
| 2004/0174895 | A1* | 9/2004 | Hiraoka | H04W 74/0816 370/442 |
| 2006/0114862 | A1 | 6/2006 | Hiraoka | |
| 2007/0194979 | A1 | 8/2007 | Hiraoka | |
| 2011/0058546 | A1* | 3/2011 | Kasa | H04L 47/56 370/389 |
| 2012/0120871 | A1* | 5/2012 | Jaeger | H04W 74/002 370/328 |

FOREIGN PATENT DOCUMENTS

| | | |
|---|---|---|
| JP | 2007-251931 A | 9/2007 |
| JP | 4014517 B2 | 11/2007 |
| JP | 4486483 B2 | 6/2010 |

OTHER PUBLICATIONS

Yang et al., "Slot Collision Probability Analysis of STDMA VHF Data Link", Proceedings of the IEEE 2008, International Conference on Information and Automation, Jun. 20-23, 2008, China, pp. 1723-1727.

International Search Report dated Sep. 12, 2017 for PCT/JP2017/021716 filed on Jun. 13, 2017, 6 pages including English translation.

* cited by examiner (A)
DIFFERENT FRAME FOR SLOT RESERVATION

| | SLOT (n) | SLOT (n+1) | SLOT (n+2) | SLOT (n+3) | SLOT (n+4) | SLOT (n+5) | SLOT (n+6) | SLOT (n+7) |
|---|---|---|---|---|---|---|---|---|
| FRAME (m) | | | A2 | | | | B5 | |
| FRAME (m+1) | | | A1 | | | | B4 | |
| FRAME (m+2) | | | A0 | | | | B3 | |
| FRAME (m+3) | | | | A7 | | | B2 | |
| FRAME (m+4) | | | | A6 | | | B1 | |
| FRAME (m+5) | | | | A5 | | | B0 | |
| FRAME (m+6) | | | | A4 | | B7 | | |

(B)
SAME FRAME FOR SLOT RESERVATION

| | SLOT (n) | SLOT (n+1) | SLOT (n+2) | SLOT (n+3) | SLOT (n+4) | SLOT (n+5) | SLOT (n+6) | SLOT (n+7) |
|---|---|---|---|---|---|---|---|---|
| FRAME (m) | | | | A3 | | | B3 | |
| FRAME (m+1) | | | | A2 | | | B2 | |
| FRAME (m+2) | | | | A1 | | | B1 | |
| FRAME (m+3) | | | | A0 | | | B0 | |
| FRAME (m+4) | | | | | A7 | | B7 | |
| FRAME (m+5) | | | | | A6 | | B6 | |
| FRAME (m+6) | | | | | A5 | | B5 | |

FIG. 10

TDMA COMMUNICATION DEVICE AND METHOD TO SELECT A TRANSMISSION SLOT WITH REDUCED RISK OF COLLISION

CROSS-REFERENCE TO RELATED APPLICATION(S)

This application is a Bypass Continuation of PCT Application No. PCT/JP2017/021716, filed Jun. 13, 2017 which claims the benefit of Japanese Application No. 2016-149963, filed Jul. 29, 2016. The entire contents of the above-identified applications are hereby incorporated by reference herein.

TECHNICAL FIELD

The present disclosure relates to a TDMA communication device and a TDMA communication method in which a plurality of stations mutually reserve a slot through which a transmission is to be performed, and each station transmits communication data using the reserved slot.

BACKGROUND

In a TDMA communication system, one frame comprised of a preset time length is time divided to or shared by a plurality of slots. Each station which performs TDMA communications transmits and receives communication data per slot. In the TDMA communication system, various kinds of detailed protocols are defined according to the system, and for example, in the AIS (Automatic Identification System) using SOTDMA communication systems disclosed in Patent Documents 1 and 2, the following rules are provided.

FIG. 11 is a view illustrating protocol to determine a transmission slot defined by the AIS. Each box illustrated in FIG. 10 indicates a slot. As illustrated in FIG. 10, the frame is comprised of a plurality of slots arranged in a time series.

As illustrated in FIG. 10, in order to transmit at a substantially constant cycle, a station which transmits in the TDMA communication system sets a selection interval SI of transmission slots St at a constant nominal increment NI. For example, the selection interval SI is comprised of a given number of continuous slots. A nominal slot NS of the selection interval SI is set at the constant nominal increment NI. Note that, as illustrated in FIG. 10, the nominal slot NS of the selection interval for the first time is referred to as "NSS," which is set when booting a TDMA communication device. In the selection interval SI including the nominal start slot NSS, the station selects one of the plurality of slots which constitute the selection interval SI as a transmission slot St, and then transmits the communication data through the transmission slot St.

Here, the station also determines the position of the transmission slot St in the next selection interval SI, and transmits the communication data along with the determined position (a reservation of the transmission slot). In subsequent selection intervals SI, the station similarly transmits the communication data in the transmission slot St along with the slot reservation information containing the position of the next transmission slot. Thus, by notifying the position of the transmission slot for the next time of one own station to other stations, a collision of the transmission slot of the own station with the transmission slot of other stations is avoided.

REFERENCE DOCUMENT OF CONVENTIONAL ART

Patent Documents

[Patent Document 1] JP4486483B2
[Patent Document 2] JP4014517B2

DETAILED DESCRIPTION

However, in the TDMA communication system, when the own station determines the position of the next transmission slot, it may not be able to use the slot reservation information from other stations. For example, simply, the own station may not be able to receive the slot reservation information from other stations. Even if the own station is able to receive the slot reservation information from other stations, processing to reflect the information on a slot map may be delayed, thereby becoming too late for the own station setting up the position of the transmission slot.

When the slot reservation information of other stations cannot be used as described above, the following problems may arise. FIG. 3 is a view illustrating the problems of the TDMA communication system of the conventional art. FIG. 11 illustrates a selected state of transmission slots of the own station (s) and another station (a). In FIG. 11, SIs indicates a selection interval of the own station (s), and NSs indicates a nominal slot of the selection interval SIs. SIa indicates a selection interval of another station (a), and NSa indicates a nominal slot of the selection interval SIa.

As illustrated in FIG. 11, in a situation where the own station (s) and another station (a) transmit through the same frame, depending on a nominal increment NIs of the own station (s), a nominal increment NIa of another station (a), and a spatial relationship between the last transmission slot of the own station (s) and the last transmission slot of another station (a), the selection interval SIs of the own station (s) and the selection interval SIa of another station (a) which are to be used for the current reservation may be at least partially overlapped with each other.

If such an overlapped section exists, the transmission slot of the own station (s) and the transmission slot of another station (a) may collide (overlap) when the transmission slot is set within the overlapped section.

Moreover, when grasping the detailed communication status of other stations, communication data related to the communication status must be frequently transmitted from other stations.

However, when the detailed communication status is transmitted as described above, the frequency of using the slot per station simply increases, and thereby the transmission slot becomes easier to collide by a plurality of stations (for example, other stations and the own station). Here, for example, by the AIS, the selection interval of the transmission slots and the nominal increment of the selection interval depend on a moving speed of the station (e.g., a ship). Each station generally changes the communication status according to the moving speed. Thus, it may be possible to grasp the detailed communication status of other stations by estimating the selection intervals of the transmission slots of other stations. This would be the same regardless of the situation if the slot reservation information of other stations are or are not available.

Therefore, one purpose of the present disclosure is to provide a TDMA communication device and a TDMA communication method, which estimate a selection interval of transmission slots of other stations.

SUMMARY

A TDMA communication device within an own station according to this disclosure may include a receiver, an estimating information acquirer (processing circuitry), and a selection interval estimator (processing circuitry). The receiver may receive communication data from another station through any of a plurality of reception slots within a selection interval set based on a given nominal increment. The estimating information acquirer may acquire estimation information for an estimated selection interval of another station based on the communication data received from another station. The selection interval estimator may set the estimated selection interval based on the estimation information.

According to this configuration, based on the communication data received from another station, the estimation information according to a selection interval of transmission slots of other stations can be obtained.

Effect of the Disclosure

According to the present disclosure, in the TDMA communication system, the selection interval of the transmission slots of other stations may be estimated.

BRIEF DESCRIPTION OF DRAWINGS

FIG. 10 is a view illustrating a concept of a slot reservation of SOTDMA used by AIS.

DETAILED DESCRIPTION

Figure 1:
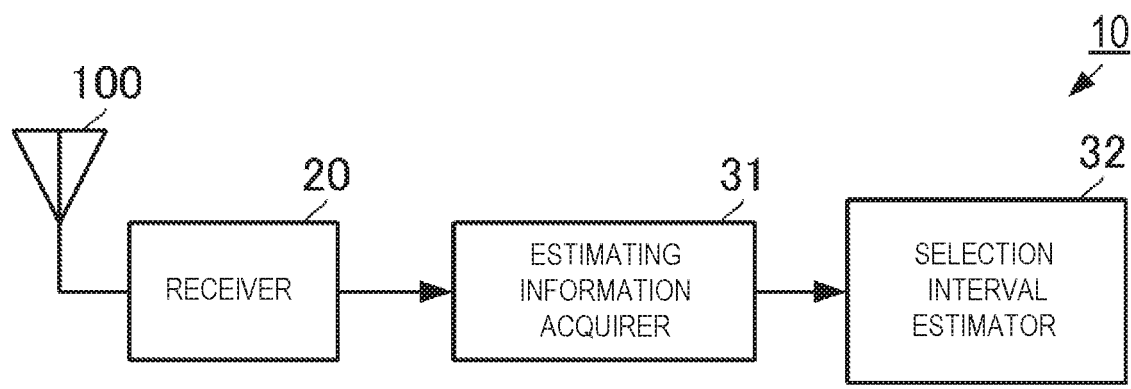
FIG. 1 is a functional block diagram of a TDMA communication device according to a first embodiment of the present disclosure.
Figure 2:
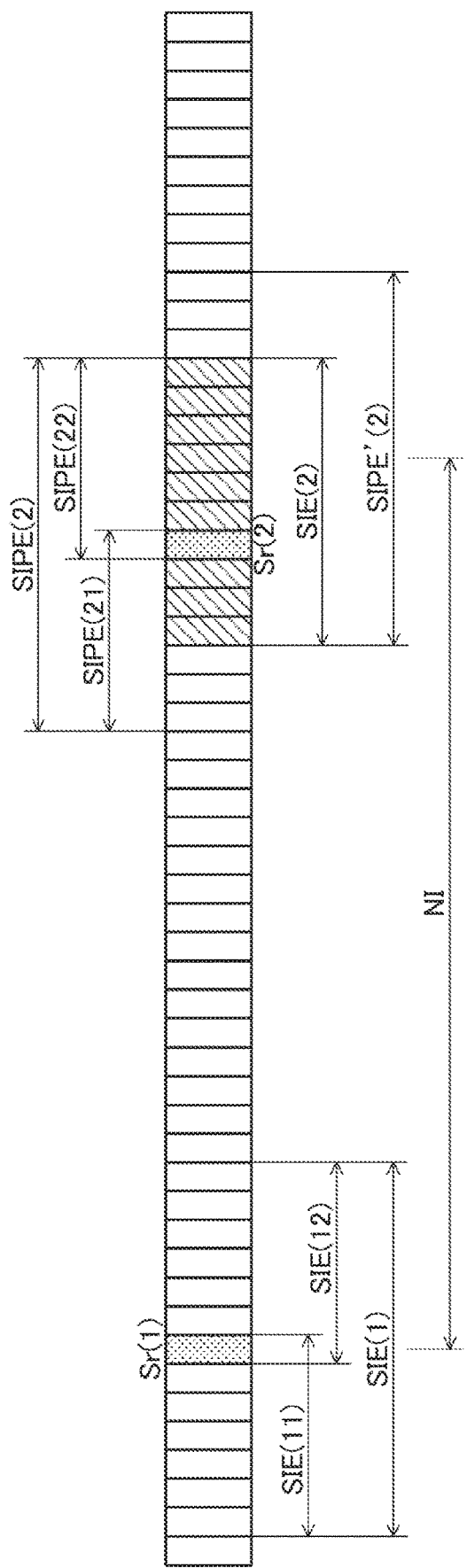
FIG. 2 is a view illustrating a concept of estimating a selection interval according to the first embodiment of the present disclosure.
Figure 3:
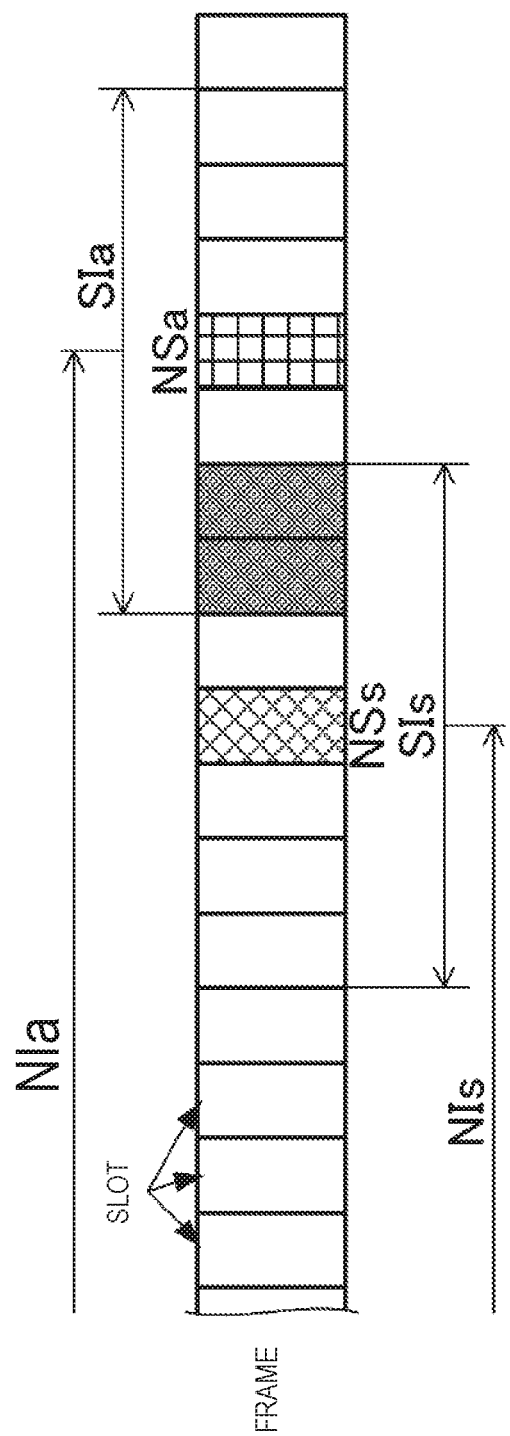
FIG. 3 is a view illustrating problems in a TDMA communication method disclosed in a conventional art.

A TDMA communication device and a TDMA communication method according to a first embodiment of the present disclosure will be described with reference to the drawings. Note that, although a case of TDMA communications used by AIS for ships is illustrated below, a configuration of this embodiment is also applicable to other TDMA communications using the same reservation system of transmission slots. FIG. 1 is a functional block diagram of the TDMA communication device according to the first embodiment of the present disclosure. FIG. 2 is a view illustrating a concept of estimating a selection interval of other stations according to the first embodiment of the present disclosure. Each box illustrated in FIG. 2 may indicate a slot.

The TDMA communication device 10 may include an antenna 100, a receiver 20, an estimating information acquirer 31, and a selection interval estimator 32. In TDMA (time division multiple access) communications used by the TDMA communication device 10, the device may divide a frame comprised of a given time length into a plurality of slots, and after one frame is finished, the frame may transit to the next frame. Each station may reserve a transmission per slot, and transmit communication data by using the reserved slot as a transmission slot.

The receiver 20 may perform a reception processing to a communication signal (communication data) received by the antenna 100, and then output it to the estimating information acquirer 31. The reception processing may include, for example, filtering, amplifying, and demodulating. The receiver 20 may output the demodulated communication data to the estimating information acquirer 31.

The estimating information acquirer 31 may acquire estimation information related to transmission of a transmission source (another station) from the communication data. For example, the estimating information acquirer 31 may acquire, as estimation information, the position of a reception slot (position of the reception slot on a timeline) from a reception time of the communication data. The estimating information acquirer 31 may acquire the position of the reception slot each time it receives the communication data.

Moreover, the estimating information acquirer 31 may calculate estimation information based on the communication data. For example, the estimating information acquirer 31 calculates, as the estimation information, a transmission rate based on an interval of receiving the communication data, i.e., an interval of the reception slot. Moreover, the estimating information acquirer 31 may calculate the transmission rate based on a ship speed, if the ship speed is contained in the communication data. The transmission rate may correspond to a nominal increment NI of the selection interval illustrated in FIG. 2.

The estimating information acquirer 31 may calculate a nominal increment NI defined by the system (corresponding to a "given nominal increment" of the present disclosure), and a time length of a selection interval SI, based on the transmission rate. The estimating information acquirer 31 may calculate the nominal increment NI based on the transmission rate if the transmission rate can be calculated. The estimating information acquirer 31 may calculate a time length of the prescribed selection interval SI based on the calculated nominal increment NI. Here, the estimating information acquirer 31 may utilize a relation between the nominal increment NI and the time length of the selection interval SI, which are defined by the system. For example, in the AIS, since the time length of the selection interval SI may be defined as 0.2 times the nominal increment NI, the estimating information acquirer 31 may calculate the time length of the prescribed selection interval SI by using the relation.

The estimating information acquirer 31 may output the nominal increment NI, the time length of the selection interval SI, and the position of the reception slot on the timeline (position of the reception slot) of another station, to the selection interval estimator 32. The nominal increment NI, the time length of the selection interval SI, and the position of the reception slot of another station may correspond to "estimation information of the selection interval of another station" of the present disclosure.

The selection interval estimator 32 may set an estimated selection interval of the transmission slots of another station based on the positions of the reception slots for two or more times, the nominal increment NI of another station, and the time length of the selection interval SI. For example, the selection interval estimator 32 may set an estimated selection interval of the transmission slots of another station by using the concept illustrated in FIG. 2.

The selection interval estimator 32 may determine a station (specific one among other stations) which will be a target for estimation of the selection interval of transmission slots. The selection interval estimator 32 may acquire, for the specific station, the position of a first reception slot Sr(1) and the position of a second reception slot Sr(2) which are adjacent to each other on the timeline. Here, on the timeline, the first reception slot Sr(1) and the second reception slot Sr(2) may be lined up from old side. The position of the first reception slot Sr(1) may correspond to the "position of a first slot" of the present disclosure. The position of the second reception slot Sr(2) may correspond to the "position of a second slot" of the present disclosure.

The selection interval estimator 32 may set an estimated selection interval SIE for the first reception slot (1) based on the first reception slot position Sr(1) and the time length of the selection interval SI. For example, the selection interval estimator 32 may set a temporary slot selection interval SIE(12) which is assumed on the basis of the first reception slot position Sr(1) being the first slot of the selection interval SI. This temporary slot selection interval SIE(12) may correspond to a "first temporary slot selection interval" of the present disclosure. The selection interval estimator 32 may set a temporary slot selection interval SIE(11) which is assumed on the basis of the first reception slot position Sr(1) being the last slot of the selection interval SI. This temporary slot selection interval SIE(11) may correspond to a "second temporary slot selection interval" of the present disclosure.

The selection interval estimator 32 may set a range of slots which belong to at least one of the temporary slot selection interval SIE(11) and the temporary slot selection interval SIE(12) as an estimated maximum selection interval SIE(1) for the first reception slot. Thus, in the estimated maximum selection interval SIE(1), the first reception slot may be the nominal slot, and the time length of the estimated maximum selection interval SIE(1) may be longer than the time length of the prescribed selection interval SI.

The selection interval estimator 32 may retard the estimated maximum selection interval SIE(1) for the first reception slot by the nominal increment NI on the timeline to set a first temporary estimation selection interval SIPE'(2).

The selection interval estimator 32 may set a second temporary estimation selection interval SIPE(2) based on the position Sr(2) of the second reception slot and the time length of the selection interval SI. For example, the selection interval estimator 32 may set a temporary slot selection interval SIPE(22) which is assumed on the basis of the second reception slot position Sr(2) being the first slot of the selection interval SI. This temporary slot selection interval SIPE(22) may correspond to a "third temporary slot selection interval" of the present disclosure. The selection interval estimator 32 may set a temporary slot selection interval SIPE(21) which is assumed on the basis of the second reception slot position Sr(2) being the last slot of the selection interval SI. This temporary slot selection interval SIPE(21) may correspond to a "fourth temporary slot selection interval" of the present disclosure.

The selection interval estimator 32 may set a range of slots which belong to at least one of the temporary slot selection interval SIPE(21) and the temporary slot selection interval SIPE(22) as the second temporary estimation selection interval SIPE(2). Thus, in the second temporary estimation selection interval SIPE(2), the second reception slot may be the nominal slot, and the time length of the second temporary estimation selection interval SIPE(2) may be longer than the time length of the prescribed selection interval SI.

The selection interval estimator 32 may set the slots where the first temporary estimation selection interval SIPE'(2) and the second temporary estimation selection interval SIPE(2) overlap with each other (obliquely-hatched slots in FIG. 2) as the estimated selection interval SIE(2) of another station.

Thus, by using the configuration of this embodiment, the estimated selection interval of the transmission slots of the specific station may be estimated easily and certainly based on the positions of the reception slots of the specific station which are adjacent to each other on the timeline, the prescribed nominal increment NI, and the time length of the prescribed selection interval SI. Note that the setting of the estimated selection interval of the transmission slot may be performed to each communication data which is received from each station, in other words, to each station which performs communication.

Note that the plurality of reception slots used for the setting of the estimated selection interval may not be adjacent to each other on the timeline. That is, two reception slots having one or more reception slots therebetween on the timeline may be selected. In this case, the retarding amount may be set by multiplying the nominal increment NI by an integer, according to the time difference between the two selected reception slots.

Figure 4:
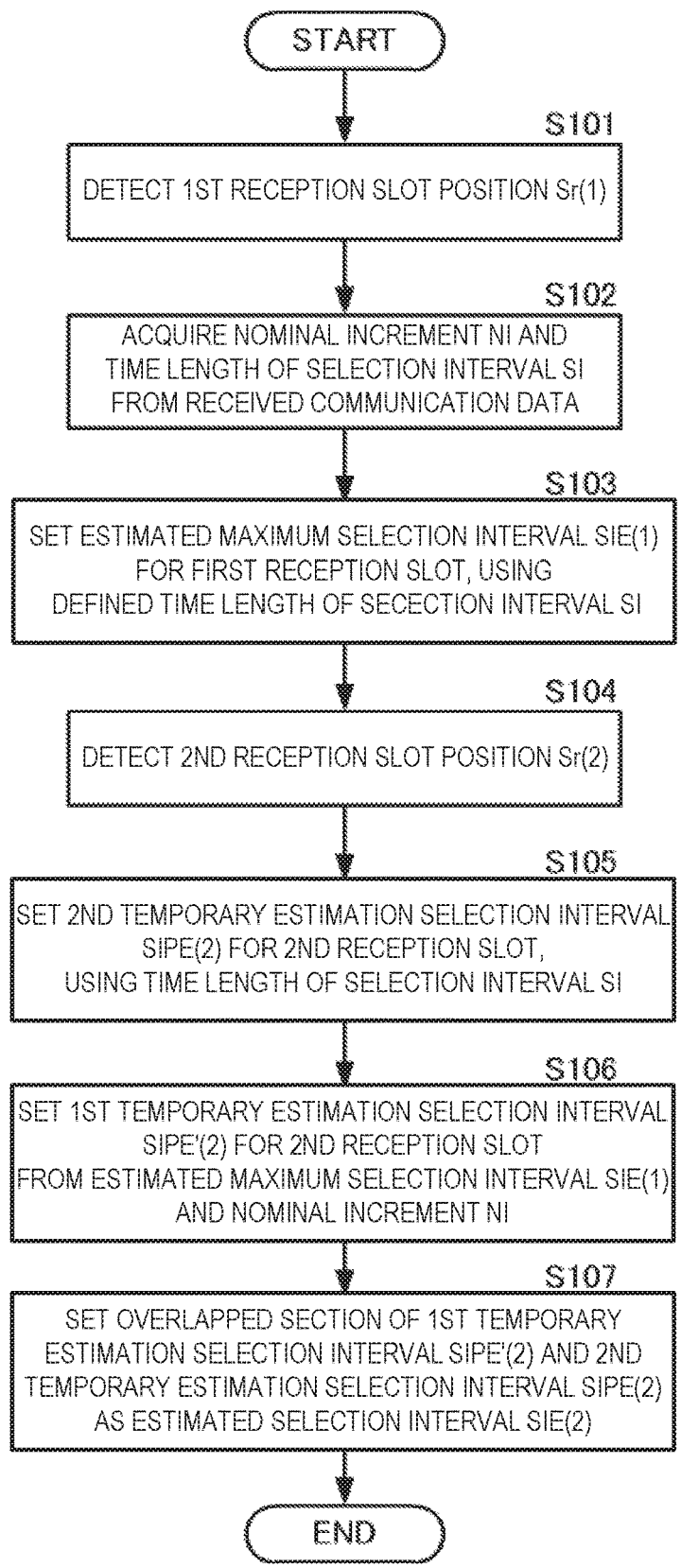
FIG. 4 is a flowchart for setting the estimated selection interval in a TDMA communication method according to the first embodiment of the present disclosure.

Although in the above description the mode in which the setting of the estimated selection interval of the transmission slots of other stations is executed by the plurality of functional parts, each comprised of hardware such as the IC, is illustrated, the setting processing of the estimated selection interval of the transmission slots may be programmed and stored in a memory etc., and this program may be executed by a processor, such as a computer or a CPU. In this case, a flowchart illustrated in FIG. 4 may be used. FIG. 4 is the flowchart for setting the estimated selection interval in the TDMA communication method according to the first embodiment of the present disclosure.

The processor may detect the first reception slot position Sr(1) (S101). The processor may acquire the nominal increment NI and the time length of selection interval SI defined by the system from the received communication data, using the method described above (S102). The processor may set the estimated maximum selection interval SIE(1) for the first reception slot from the first reception slot position Sr(1) and the time length of the selection interval SI, using the method described above (S103).

The processor may detect the second reception slot position Sr(2) on the timeline (S104). The processor may set the second temporary estimation selection interval SIPE(2)

from the second reception slot position Sr(2) and the time length of the selection interval SI, using the method described above (S105).

The processor may set the first temporary estimation selection interval SIPE'(2) from the estimated maximum selection interval SIE(1) and the nominal increment NI for the first reception slot, using the method described above (S106). Note that the setting of the second temporary estimation selection interval SIPE(2) and the setting of the first temporary estimation selection interval SIPE'(2) may be executed in this order or may be in the reversed order, or may be simultaneously executed in parallel.

The processor may set the overlapped section of the second temporary estimation selection interval SIPE(2) and the first temporary estimation selection interval SIPE'(2) as the estimated selection interval SIE(2) (S107).

Figure 5:
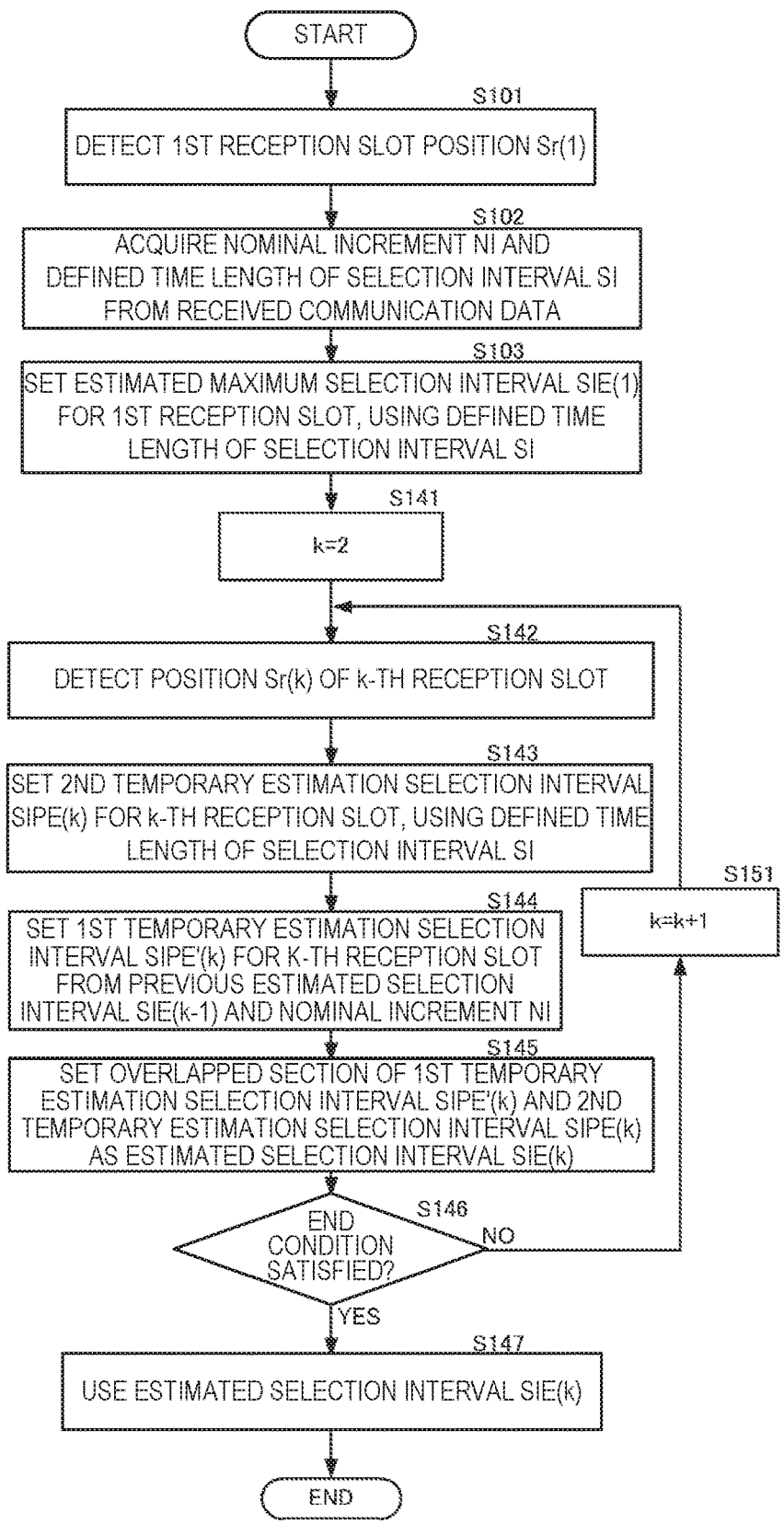
FIG. 5 is another flowchart for setting the estimated selection interval in the TDMA communication method according to the first embodiment of the present disclosure.

Note that in the above description the mode in which the estimated selection interval is set by the one-time detection of the overlapped section is illustrated. As illustrated below, the detection of the overlapped section may be repeated and updated to make the estimated selection interval SIE approach a true selection interval SI of another station. FIG. 5 is another flowchart for estimating the selection interval in the TDMA communication method according to the first embodiment of the present disclosure. Note that Steps S101, S102, and S103 are the same as those in the flowchart of FIG. 4 and, thus, description thereof is omitted.

The processor may set k=2 after processing of Step S103 (S141).

The processor may detect the position Sr(k) of the k-th reception slot (S142). The processor may set the second temporary estimation selection interval SIPE(k) for the k-th reception slot from the position Sr(k) of the k-th reception slot and the time length of the selection interval SI, using the method described above (S143).

The processor may set the first temporary estimation selection interval SIPE'(k) for the k-th reception slot from the estimated selection interval SIE(k−1) for the k−1th reception slot and the nominal increment NI, using the method described above (S144). Here, if k=2, the estimated maximum selection interval SIE(1) may be used, and if k≥3, the last estimated selection interval SIE(k−1) may be used. Moreover, the setting of the first temporary estimation selection interval SIPE'(k) and the setting of the second temporary estimation selection interval SIPE(k) may be executed in this order or may be in the reversed order, or may be simultaneously executed in parallel.

The processor may set the overlapped section of the first temporary estimation selection interval SIPE'(k) and the second temporary estimation selection interval SIPE(k) as the estimated selection interval SIE(k) (S145).

If an end condition of the setting of the estimated selection interval is not satisfied (S146: NO), the processor may execute processing of k=k+1 (S151), and return to Step S142.

Thereafter, the processor may use the time length of the estimated selection interval SIE(k−1) which is set based on the overlapped section obtained from the last processing, for setting the first temporary estimation selection interval SIPE'(k) of Step S144.

For example, as for the estimated selection interval SIE(2) of the second reception slot, the overlapped section of the first temporary estimation selection interval SIPE'(2) obtained from the first reception slot and the second temporary estimation selection interval SIPE(2) obtained from the second reception slot, may be used, as described above. As for an estimated selection interval SIE(3) of a third reception slot (this third reception slot corresponds to a "third slot" of the present disclosure), the overlapped section of the first temporary estimation selection interval SIPE'(3) which is obtained by retarding the estimated selection interval SIE(2) for the second reception slot by the nominal increment NI, and the second temporary estimation selection interval SIPE(3) which is obtained from the third reception slot and the time length of the selection interval SI, may be used. That is, the overlapped section may be calculated using the second temporary estimation selection interval SIPE(3) calculated based on the position of the third reception slot and the last estimated selection interval. Thereafter, similar processing for detecting the overlapped section may be repeated to update the overlapped section.

Note that, the last estimated selection interval is not limited to one using the last reception slot of the third reception slot, but may use at least one of a plurality of estimated selection intervals SIE obtained earlier. In this case, the retarding time of the estimated selection interval may be set according to a time difference between the time of the estimated selection interval used for this processing and the time of the third reception slot. Here, the retarding time may be set based on the nominal increment NI.

Here, the end condition may be set, for example, when k becomes a given value, or when the number of times that the time length of the estimated selection interval SIE(k) does not become shorter than the time length of the estimated selection interval SIE(k−1) reaches a given number of times. Note that the setting of the end condition is not limited to the above configuration, but the end condition may suitably be set according to the accuracy and rate of the estimation of the estimated selection interval SIE(k).

Note that although illustration is omitted, if the transmission rate (i.e., the nominal increment NI and the time length of the selection interval SI) changes during the calculation of the estimated selection interval SIE, the estimated selection interval may be initialized and the processing described above may be executed using the new nominal increment NI and the time length of the selection interval SI.

If the end condition is satisfied (S146: YES), the processor may use the set estimated selection interval SIE(k) (S147).

By using such processing, unless all the temporal positions of the transmission slots in the selection interval of another station (the temporal position of the reception slot for the own station) are the same, the estimated selection interval SIE(k) can be approximated having the true selection interval SI of another station as the minimum range. Therefore, the estimation accuracy of the estimated selection interval SIE(k) may improve.

Figure 6:
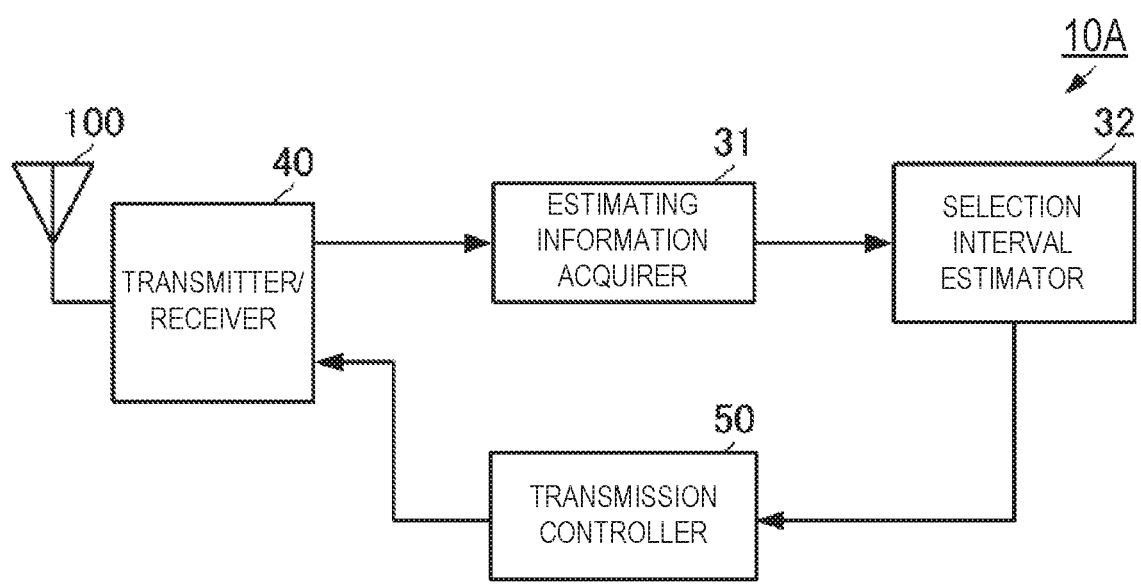
FIG. 6 is a functional block diagram of a TDMA communication device according to a second embodiment of the present disclosure.

Next, a TDMA communication device and a TDMA communication method according to a second embodiment of the present disclosure are described with reference to the drawings. FIG. 6 is a functional block diagram of the TDMA communication device according to the second embodiment of the present disclosure. The TDMA communication device 10A according to this embodiment may be configured by adding a transmission controller 50 to the TDMA communication device 10 according to the first embodiment. Moreover, it may be provided with a transmitter/receiver 40, instead of the receiver 20.

The estimated selection interval SIE of another station which is set by the selection interval estimator 32 may be inputted into the transmission controller 50. The transmission controller 50 may detect the possibility of a collision of the transmission slot of the own station and the transmission slot of another station based on a spatial relationship on the timeline between the estimated selection interval SIE of another station and the selection interval of the own station. The transmission controller 50 may set the transmission slot of the own station so as to avoid the collision with the transmission slot of another station. The transmission controller 50 may transmit the communication data (communication signal) of the own station to another station through the transmitter/receiver 40 and the antenna 100, by using the set transmission slot.

Figure 7:
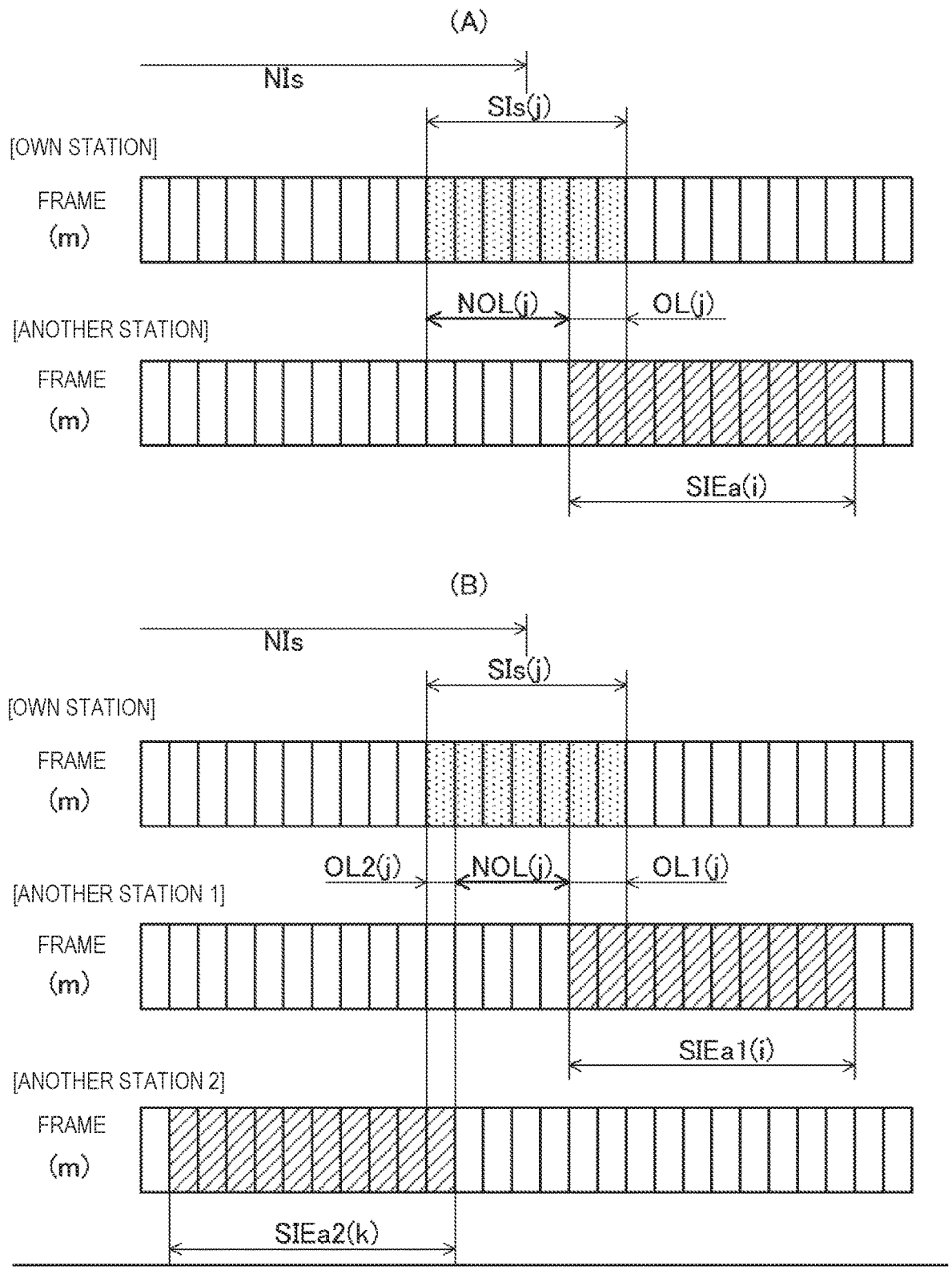
FIG. 7 is a view illustrating a concept of a detection method of the possibility of a collision and a collision avoiding method, according to the second embodiment of the present disclosure.

Next, the detection method of the possibility of the collision and a collision avoiding method by the TDMA communication device 10A are described in more detail. FIGS. 7(A) and 7(B) are views illustrating the concept of the detection method of the possibility of the collision and the collision avoiding method according to the second embodiment of the present disclosure. FIG. 7(A) illustrates a case where other stations include a single station, and FIG. 7(B) illustrates a case where other stations include two stations. Note that in FIGS. 7(A) and 7(B), NIs is a nominal increment of the selection interval SIs of the own station. A selection interval SIs(j) is determined based on the last selection interval SIs(j−1) and the nominal increment NIs.

When an estimated selection interval SIEa(i) of another station is acquired from the selection interval estimator 32, the transmission controller 50 may detect the existence of overlapping with the selection interval SIs(j) of the own station. The transmission controller 50 may set the next transmission slot from the slots within the selection interval SIs(j) of the own station, which do not currently overlap with the estimated selection interval SIE of another station, as a preprocessing of transmission by the own station.

In the case of FIG. 7(A), the estimated selection interval SIEa(i) of another station and the selection interval SIs(j) of the own station may overlap by two slots (an overlapped section OL(j)), and other slots of the selection interval SIs(j) of the own station may not overlap (a non-overlapped section NOL(j)).

The transmission controller 50 may select one slot from the non-overlapped section NOL(j) in the selection interval SIs(j), and set it as the transmission slot. Therefore, the transmission slot of the own station may be prevented from overlapping with the transmission slot of another station.

In the case of FIG. 7(B), the selection interval Sis(j) of the own station may include an overlapped section OL1(j) of the estimated selection interval SIEa1(i) of another station (station 1) and the selection interval SIs(j) of the own station, an overlapped section OL2(j) of an estimated selection interval SIEa2(k) of another station (station 2) and the selection interval SIs(j) of the own station, and a non-overlapped section NOL(j) which does not overlap with any of them.

The transmission controller 50 may select one slot from the non-overlapped section NOL(j) within the selection interval SIs(j), and set it as a transmission slot. Therefore, the transmission slot of the own station may be prevented from overlapping with the transmission slots of other stations.

If there is no non-overlapped section NOL, i.e., if all the slots of the selection interval SIs(j) of the own station overlap with the estimated selection intervals SIE of other stations, the transmission controller 50 may calculate a collision probability Cp over each slot within the selection interval SIs(j) of the own station.

Here, the probability that the slot of the selection interval SIs(j) of the own station overlaps with the estimated selection intervals SIE of other stations, and this slot is selected as the transmission slot of another station is 1/Na, if the number of slots of the estimated selection intervals SIE of other stations is Na.

Therefore, the probability that one slot within the selection interval SIs(j) of the own station is selected as the transmission slot by all the other stations where the estimated selection intervals SIE overlap is referred to as the collision probability Cp, and it is calculated by the following equation.

$$Cp = 1 - \Pi\{(Na(i)-1)/Na(i)\} \quad \text{(Equation 1)}$$

Na(i) is the number of slots of the estimated selection interval SIE(i) of another station i which overlap with the selection interval SIs of the own station.

The transmission controller 50 may calculate the collision probability Cp for each slot within the selection interval SIs of the own station, which overlaps with the estimated selection intervals SIE of other stations, by using Equation 1.

By performing such a calculation, the transmission controller 50 may calculate the collision probability Cp for each slot of the selection interval SIs of the own station. The collision probability Cp may decrease as the possibility of colliding with the transmission slots of another station is reduced, and increase as the possibility of colliding with the transmission slots of another station is increased. Therefore, the transmission controller 50 may set the slot having the lowest collision probability Cp as the transmission slot of the own station. More practically, the transmission controller 50 may select a plurality of slots with lower probabilities of collision Cp, and set the transmission slot among the slots. This selection may be utilized in a mode in which, for example, a threshold is provided for the collision probability Cp, and selects a plurality of slots with the probabilities of collision Cp below the threshold, or a mode in which the probabilities of collision Cp are sorted in a descending order, and a given number (a plurality of) slots with lower probabilities are selected. Therefore, the collision of the transmission slot with other stations can be prevented.

Note that a logarithm likelihood value obtained by adding a logarithmic value of the probability for each of other stations may be used instead of the collision probability Cp of Equation 1. Therefore, the possibility of collision of each slot of the own station with the transmission slots of other stations may be compared with a simpler calculation. Therefore, for example, a reduction of resources of the transmission controller 50 and a speed-up of the selection of the transmission slot of the own station can be achieved.

Figure 8:
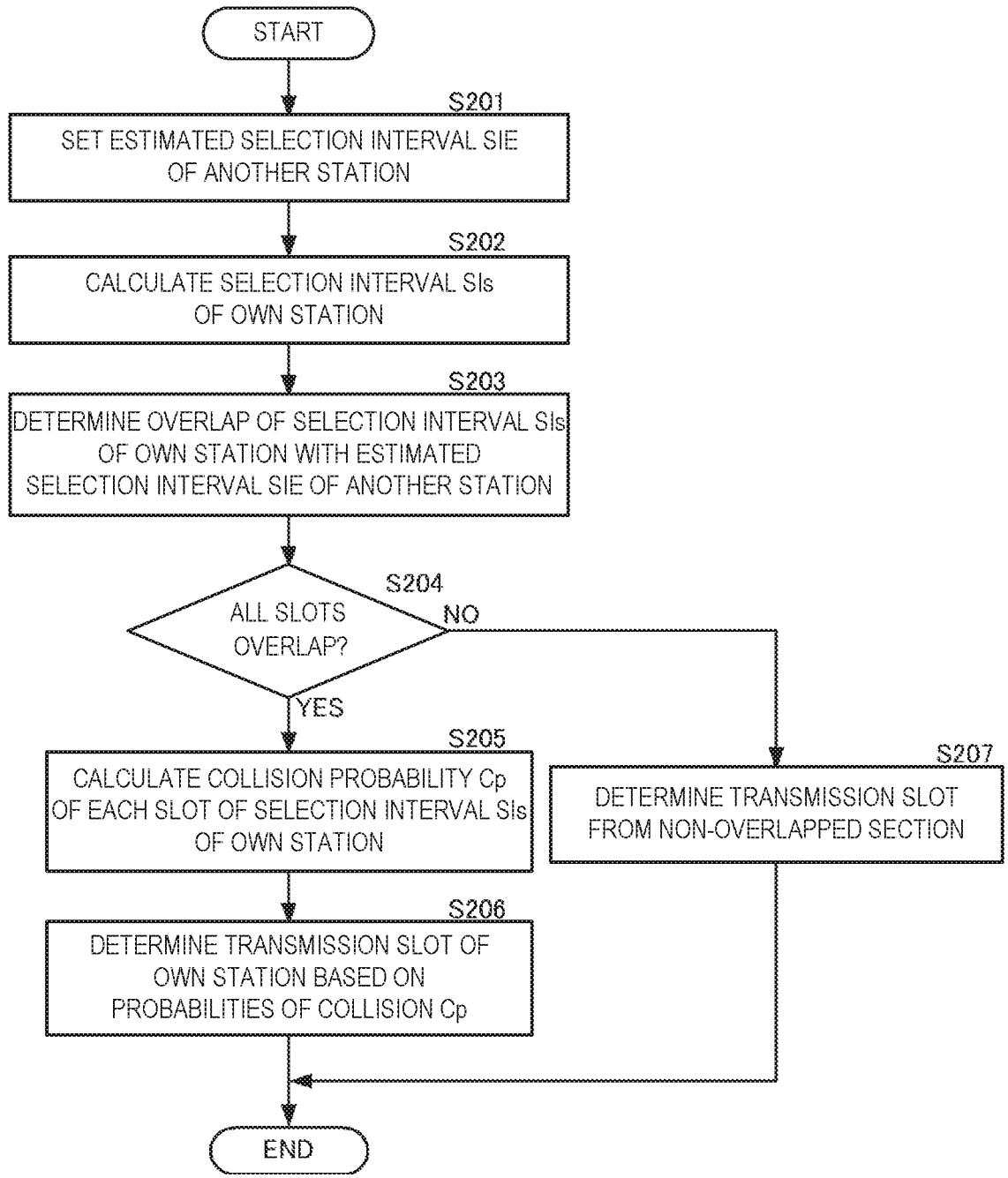
FIG. 8 is a flowchart for selecting a transmission slot in a TDMA communication method according to the second embodiment of the present disclosure.
Figure 9:
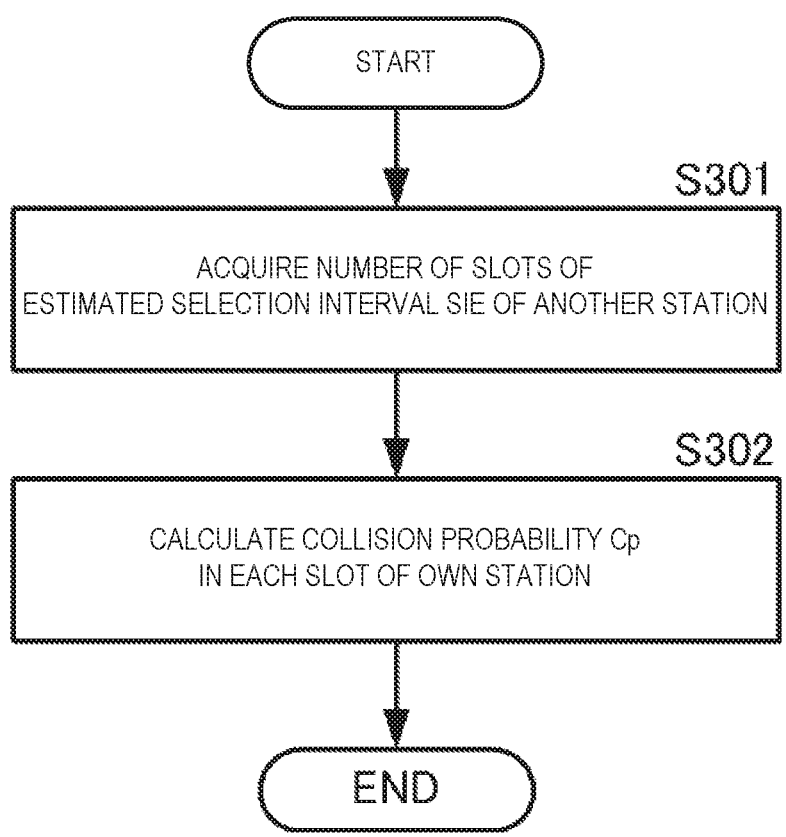
FIG. 9 is a flowchart for calculating the probability of the collision in the TDMA communication method according to the second embodiment of the present disclosure.
Figure 11:
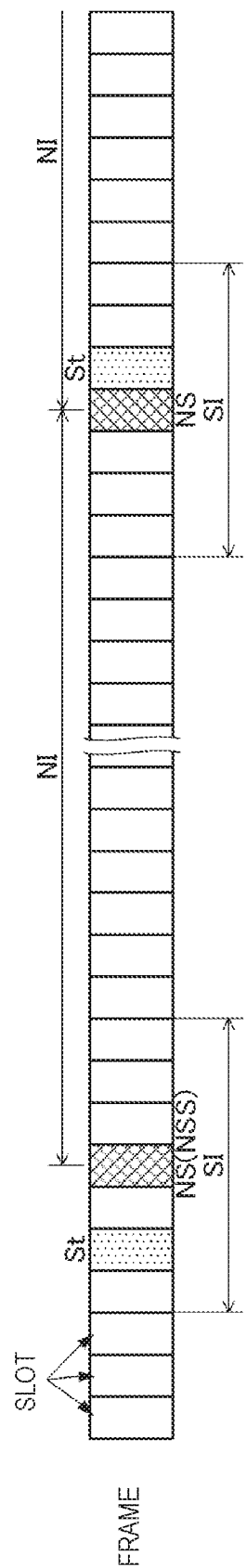
FIG. 11 is a view illustrating a protocol for determining the transmission slot defined by the AIS.

Note that in the above description the mode in which the detection of the possibility of the collision with the transmission slots of other stations is executed by the transmission controller 50, and the estimation of the selection interval of the transmission slots of other stations is executed by other functional parts. However, the estimation of the selection interval of the transmission slots of other stations and the selection of the transmission slot of the own station may be programmed and stored in the memory etc., and the program may be executed by a processor, such as a computer or a CPU. In this case, flowcharts illustrated in FIGS. 8 and 9 may be used. FIG. 8 is a flowchart for selecting the transmission slot in the TDMA communication method according to the second embodiment of the present disclosure. FIG. 9 is a flowchart for calculating the collision probability in the TDMA communication method according to the second embodiment of the present disclosure.

As illustrated in FIG. 8, the processor may set the estimated selection interval SIE of another station (S201). Note that the method according to the first embodiment (refer to FIGS. 4 and 5) may be used for the setting of the estimated selection interval SIE of another station.

The processor may calculate the selection interval SIs of the own station based on the nominal start slot NSS and the nominal increment NIs (S202). The processor may determine the overlap of the selection interval SIs of the own station with the estimated selection interval SIE of another station (S203). If there are any non-overlapped sections (S204: NO), the processor may select the non-overlapped slots as the transmission slot (S207).

If all the slots overlap, in other words, there is no non-overlapped section (S204: YES), the processor may calculate the collision probability Cp of each slot of the selection interval SIs of the own station (S205). For example, as illustrated in FIG. 9, the processor may acquire, for every slot of the selection interval SIs of the own station, the number of slots Na of the estimated selection interval SIE of another station, which overlap with the slot concerned (S301). The processor may calculate the collision probability Cp by using Equation 1 described above based on the number of all the slots Na(i) of the estimated selection interval SIE of other stations i which overlap (S302). Note that, in this case, the logarithm likelihood value may also be used for the collision probability Cp.

The processor may determine the transmission slot of the own station based on the probabilities of collision Cp (S206).

The estimation of the selection intervals of other stations and the avoidance of the collision with the transmission slots of other stations may be utilized as follows by the AIS in the TDMA communication described above. FIG. 10 is a view illustrating a concept of a slot reservation of SOTDMA used by the AIS. FIG. 10(A) illustrates a case where other stations A and B have different frames for slot reservation, and FIG. 10(B) illustrates a case where other stations A and B have the same frame for slot reservation.

In the AIS, when reserving the transmission slot, a timeout value may be set. In the AIS, the same slot of a future frame may be temporarily reserved according to the number of frames corresponding to the timeout value. For example, as illustrated in FIG. 10(A), when the station A sets the timeout value "7" in a frame (m+3) and reserves a slot (n+3), the slot (n+3) may be temporarily reserved for seven frames at and after a frame (m+4). At and after the frame (m+4), the station A may reserve the slot (n+3) while subtracting the timeout value "1" for every frame. Then, the station A may select the position of the transmission slot in the next frame when the timeout value becomes "0."

In FIG. 10(A), the station B may watch the reservation status of the station A, and reserve the transmission slot so as not to collide with the station A. For example, in a frame (m+6), since the reservation of the slot (n+3) by the station A is continuing, the station B reserves a slot (n+5) while excluding the slot (n+3).

Thus, when the slots of a plurality of currently-communicating stations which have the timeout value becoming "0" are separated in time, since each station can grasp the reservation slot of other stations, collisions may be avoided.

However, as illustrated in a frame (m+3) of FIG. 10(B), when the slot of the station A of which the timeout value is "0" and the slot of the station B of which the timeout value is "0" are close to each other in time, the stations A and B may be unable to mutually grasp the next reservation slots. In such a case, the possibility of the collision of the transmission slots may be prevented by estimating the selection interval as described above.

Note that in the above description the mode in which, when the transmission slot reservation information of other stations is not available, the selection intervals of the transmission slots of other stations may be estimated is illustrated. However, if the transmission slot reservation information of other stations is available, the selection intervals of the transmission slots of other stations may be estimated based on the transmission slot reservation information.

In this case, the TDMA communication device 10 may execute the following processing.

The receiver 20 may perform reception processing for the communication signal (communication data) received by the antenna 100, and output it to the estimating information acquirer 31. The reception processing is, for example, filtering, amplifying, and demodulating. The communication data may include the slot reservation information of other stations (transmission-source stations), and the slot reservation information of other stations can be acquired by demodulating the communication data. The slot reservation information may include the positions (positions on the timeline) of the reservation slots of other stations.

The estimating information acquirer 31 may detect the position of the reservation slot from the slot reservation information. The estimating information acquirer 31 may temporally repeat the detection of the position of the reservation slot. The estimating information acquirer 31 may calculate the prescribed nominal increment NI based on the nominal increment of two reservation slots at different times. Other processings of the estimating information acquirer 31 may be the same as the processing described in the first embodiment, but the position of the reception slot may be replaced with the position of the reservation slot.

The selection interval estimator 32 may estimate the selection interval of the transmission slots of another station by using the positions of the reservation slots for a plurality of times, the nominal increment NI of another station, and the time length of the selection interval SI. The estimation of the selection interval of the transmission slots of another station may be realized by replacing the position of the reception slot in the first embodiment with the position of the reservation slot.

Thus, even in a situation where the reservation slots of other stations are detectable, the selection intervals of the transmission slots of other stations may be estimated easily and certainly.

Moreover, by estimating the selection intervals of the transmission slots of other stations as described above, the detailed communication status of other stations may be grasped. For example, in the AIS, the selection interval of the transmission slots, and the nominal increment of the selection interval may depend on the moving speed of the station (ship etc.). Moreover, each station may generally change the communication status according to the moving speed. Therefore, the detailed communication status of other stations may be grasped by estimating the selection interval.

Moreover, this configuration using the reservation slot is also applicable to the TDMA communication device 10A according to the second embodiment.

Moreover, also in the TDMA communication method described in each embodiment, the reception slot may be replaced with the reservation slot. Therefore, the same operation and effects as the TDMA communication method described in each embodiment may be acquired.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface". The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately", "about", and "substantially" as used herein include the recited numbers, and also represent an amount close to the stated amount that still performs a desired function or achieves a desired result. For example, the terms "approximately", "about", and "substantially" may refer to an amount that is within less than 10% of the stated amount. Features of embodiments disclosed herein preceded by a term such as "approximately", "about", and "substantially"

as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A TDMA communication device within an own station, comprising:
   a receiver configured to receive communication data from another station through any of a plurality of reception slots within a selection interval set based on a given nominal increment; and
   processing circuitry configured to:
      detect a first reception slot position and a second reception slot position,
      acquire the given nominal increment and time length of the selection interval-based on the communication data received from another station,
      estimate an estimated maximum selection interval based on the time length of the selection interval and the first reception slot position,
      estimate a first temporary estimation selection interval based on the first reception slot position, the given nominal increment, and the estimated maximum selection interval,
      estimate a second temporary estimation selection interval based on the time length of a selection interval and the second reception slot position,
      estimate an estimated selection interval based on the first temporary estimation election interval and the second temporary estimation selection interval,
      set a transmission slot for the own station based on the estimated selection interval, and
      transmit data from the own station using the set transmission slot.

2. The TDMA communication device of claim 1, wherein the processing circuitry is further configured to:
   estimate an overlapped section of the first temporary estimation selection interval and the second temporary estimation selection interval as the estimated selection interval of another station.

3. The TDMA communication device of claim 2, wherein the processing circuitry is further configured to:
   estimate a first temporary slot selection interval assuming the position of the first slot is a first slot of the selection interval,
   estimate a second temporary slot selection interval assuming the position of the first slot is a last slot of the selection interval,
   estimate a section included in any of the first temporary slot selection interval and the second temporary slot selection interval as an estimated maximum selection interval for the first slot, and
   estimate the first temporary estimation selection interval by delaying the estimated maximum selection interval for the given nominal increment.

4. The TDMA communication device of claim 2, wherein the processing circuitry is further configured to:
   estimate a third temporary slot selection interval assuming the position of the second slot is a first slot of the selection interval,
   estimate a fourth temporary slot selection interval assuming the position of the second slot is a last slot of the selection interval, and
   estimate a section included in any of the third temporary slot selection interval and the fourth temporary slot selection intervals as the second temporary estimation selection interval.

5. The TDMA communication device of claim 2, wherein the processing circuitry is further configured to:
   use a position of a third slot different from the first slot and the second slot,
   update the overlapped section by using the second temporary estimation selection interval calculated based on at least one of previous time estimated selection intervals of another station, and the position of the third slot, and
   estimate the estimated selection interval of another station based on the updated overlapped section.

6. The TDMA communication device of claim 1, wherein the processing circuitry is further configured to:
   set a transmission slot of the own station based on the estimated selection interval of another station, and a selection interval of the own station.

7. The TDMA communication device of claim 6, wherein the processing circuitry is further configured to:
detect an existence of an overlap of the estimated selection interval of another station and the selection interval of the own station, and
   set non-overlapping slots as the transmission slot of the own station.

8. The TDMA communication device of claim 6, wherein the processing circuitry is further configured to:
   calculate a collision probability that is a probability that each slot in the selection interval of the own station collides with a transmission slot of another station based on the estimated selection interval of another station and the selection interval of the own station, and
   set the slot with a low collision probability as the transmission slot of the own station.

9. The TDMA communication device of claim 8, wherein the collision probability is a logarithm.

10. A TDMA communication method, comprising:
    receiving communication data from another station through any of a plurality of reception slots within a selection interval set based on a given nominal increment;
    acquiring the given nominal increment and time length of the selection interval based on the communication data received from another station;
    estimating an estimated maximum selection interval based on the time length of the selection interval and the first reception slot position,
    estimating a first temporary estimation selection interval based on the first reception slot position, the given nominal increment, and the estimated maximum selection interval,
    estimating a second temporary estimation selection interval based on the time length of a selection interval and the second reception slot position,
    estimating an estimated selection interval based on the first temporary estimation election interval and the second temporary estimation selection interval,
    set a transmission slot for the own station based on the estimated selection interval, and transmit data from the own station using the set transmission slot.

\* \* \* \* \*